United States Patent
Strekal et al.

(10) Patent No.: US 11,708,533 B2
(45) Date of Patent: Jul. 25, 2023

(54) SOLID INERT RESIDUE (SIR) DRYER AND EXTRACTOR SYSTEM

(71) Applicant: RES POLYFLOW LLC, San Francisco, CA (US)

(72) Inventors: George W. Strekal, Conneaut, OH (US); Jay Schabel, Hiram, OH (US); Richard A. Schwarz, Akron, OH (US); Mehmet A. Gencer, Brecksville, OH (US); Richard K. Peterson, Huntertown, IN (US); Cassten Everidge, Hudson, IN (US)

(73) Assignee: RES Polyflow LLC, San Francisco, CA (US)

( * ) Notice: Subject to any disclaimer, the term of this patent is extended or adjusted under 35 U.S.C. 154(b) by 0 days.

(21) Appl. No.: 17/411,836

(22) Filed: Aug. 25, 2021

(65) Prior Publication Data
US 2022/0064535 A1 Mar. 3, 2022

Related U.S. Application Data

(60) Provisional application No. 63/071,407, filed on Aug. 28, 2020.

(51) Int. Cl.
*C10B 33/00* (2006.01)
*C10B 53/07* (2006.01)
(Continued)

(52) U.S. Cl.
CPC ............. *C10B 33/003* (2013.01); *B09B 3/40* (2022.01); *C10B 33/02* (2013.01); *C10B 39/02* (2013.01);
(Continued)

(58) Field of Classification Search
CPC ....... C10B 33/003; C10B 33/02; C10B 39/02; C10B 39/12; C10B 53/07; B09B 3/40; F26B 3/04
See application file for complete search history.

(56) References Cited

U.S. PATENT DOCUMENTS 3,545,093 A 12/1970 Forster
4,802,424 A * 2/1989 McGinnis, III ......... F23G 5/004
110/236

(Continued)

*Primary Examiner* — Jonathan Miller
(74) *Attorney, Agent, or Firm* — Hudak, Shunk & Farine Co. LPA

(57) ABSTRACT

Plastic conversion vessels such as pyrolytic reactors convert plastic waste materials such as polymers, or hydrocarboneous material, or both, via in situ chemical reactions comprising cracking, recombination, reforming, recracking, and the like, to usable chemical compounds such as naphtha, diesel fuel, heavy oil, wax, and the like. Inherent within the polymers and/or carbonaceous material are generally solid, inert residues such as various fillers, pigments, flame retardants, silica, aluminum, talc, glass, clay, and so forth. Such solid inert residues (SIR) must be treated to remove residual volatile organic material therefrom in order to meet acceptable environmental standards and/or limits. A heated dryer for treating the SIR comprises heating units to remove excessive volatile organic material therefrom as when moved along a conveyor that transfers said material to a collection area. The collection area comprises one or more pistons that are capable of compacting and discharging said SIR material. Another collection area embodiment comprises a plurality of plungers that transfer the SIR material from said collection area to a plunger collection area, and subsequently to a collection container.

22 Claims, 9 Drawing Sheets

(51) Int. Cl.
  *F26B 3/04*  (2006.01)
  *C10B 39/02*  (2006.01)
  *C10B 39/12*  (2006.01)
  *C10B 33/02*  (2006.01)
  *B09B 3/40*  (2022.01)

(52) U.S. Cl.
  CPC .............. *C10B 39/12* (2013.01); *C10B 53/07* (2013.01); *F26B 3/04* (2013.01)

(56) References Cited

U.S. PATENT DOCUMENTS

| | | |
|---|---|---|
| 4,953,457 A | 9/1990 | Campo |
| 4,977,839 A | 12/1990 | Fochtman et al. |
| 5,188,041 A | 2/1993 | Noland et al. |
| 5,611,766 A | 3/1997 | Carle et al. |
| 8,801,904 B2 * | 8/2014 | Miller ..................... C10K 1/10 |
| | | 700/270 |
| 10,711,202 B2 * | 7/2020 | Schabel .................... C10B 5/00 |
| 2014/0360889 A1 | 12/2014 | Jones et al. |

* cited by examiner

SOLID INERT RESIDUE (SIR) DRYER AND EXTRACTOR SYSTEM

FIELD OF THE INVENTION

The present invention relates to a plastic conversion vessel that pyrolyzes plastic waste material such as polymers, or hydrocarboneous material, or both via in situ chemical reactions comprising cracking, recombination, reforming, recracking, and the like, and volatilizes and removes various usable chemical compounds therefrom such as naphtha, diesel fuel, heavy oil, wax, and the like. The polymers and/or carbonaceous material generally contain solid inert residues (SIR) such as various fillers, pigments, flame retardants, silica, aluminum, talc, glass, clay, and so forth. Such SIRs are emitted from the plastic conversion vessel and must be treated to remove volatile organic material therefrom in order to meet acceptable environmental standards. A heated dryer for treating the emitted SIR comprises heating said residues to substantially remove the volatile organic material therein before it is transported to a collection area. The collection area comprises one or more cylinders having pistons, or isolating valves, or augers that are capable of compacting and discharging said SIR containing very low but acceptable amounts of volatile organic material. In a revised embodiment, a modified collection area referred to as a conveyance system is utilized that contains a plurality of plungers, or isolating valves, or augers to convey the dried SIR to suitable container for proper environmental disposal thereof. Moreover, various seals prevent flammable and/or harmful vapors from escaping conveyance system.

BACKGROUND OF THE INVENTION

Heretofore, solid inert residues (SIR) discharged from pyrolytic reactors, often as a char, generally have been deposited in landfills or used as a filler, and in some cases have been used as a raw material or even as a soil amendment.

SUMMARY OF THE INVENTION

The volatile organic material contained in the SIR emitted from plastic conversion vessels, such as pyrolytic reactors, must be removed so that the residue material can meet various environmental regulations before disposal. A dryer system is utilized wherein heated dryers are utilized to volatilize and substantially remove any remaining organic material present within the SIR. Preferably a sweep gas comprising an inert, non-condensable gas is also utilized to liberate the volatile organic material from the SIR. Once the SIR have been generally been substantially liberated of volatile organic material, the residues are transferred to a collection area that compresses (compacts) the residues into a mass of material. The collection area is locked, i.e., is gas-tight so that any air or remaining volatile organic material cannot escape to the atmosphere but the SIR can be compressed and discharged from the collection area and subsequently disposed. In the conveyance embodiment, a sweep gas generally is not utilized in the dryer to remove various gases therefrom since previously, it has been purged of oxygen.

Generally, a SIR dryer, comprises said dryer having one or more heating units and one or more drying substrates, said dryer capable of heating and drying a SIR on said substrate and removing a volatile organic material therefrom; said substrate capable of transferring said dried SIR to a collection area; and said collection area comprising a compression system for compacting said dried SIR. In the conveyance embodiment, multiple plungers, or isolating valves and augers, are utilized to efficiently compact and collect the SIR.

A process for removing a volatile organic material from a SIR, comprising the steps of adding a SIR to a dryer; heating said dryer and removing said volatile organic material from said SIR; transferring said dried SIR material to a collection area; and collecting said dried SIR.

A conveyance apparatus for transferring a SIR, comprising a collection area for said SIR; a first conveying plunger for moving said SIR; a second conveying plunger for moving said SIR, said second conveying plunger located substantially transverse to said first conveying plunger; and a third conveying plunger for transferring said SIR, said third conveying plunger located substantially transverse to said second conveying plunger.

BRIEF DESCRIPTION OF THE DRAWINGS

The foregoing and other features of the present invention will become apparent to those skilled in the art to which the present disclosure relates upon reading the following description with reference to the accompanying drawings, in which:

FIG. 3A shows SIR that falls by gravity into an inlet of a horizontal cylinder where a first piston travels, with the piston travel both conveying SIR and creating a seal against vapor escaping the vessel;

FIG. 3B shows a first piston that is actuated to compress the SIR against a second piston mounted perpendicular to the travel of the first piston, this forces the SIR into a sealing plug against the side of the second piston;

FIG. 3C shows when the cylinder for the first piston is "full", as registered by position sensors in the piston mechanism, a second piston moves backwards, while the first piston stays in position to seal off the SIR inlet;

FIG. 3D shows the first piston that then moves forward, pushing compressed SIR into the travel path of the second piston;

FIG. 3E shows the second piston then moves forward (down), pushing the SIR against the closed end valve of the system, it then moves back into position covering the inlet from piston 1;

FIG. 3F shows when the second cylinder is full, the first piston again covers the inlet as it pushes the last "plug" of SIR into the second cylinder;

FIG. 3G shows the end valve then opens as the second piston pushes SIR material out of the system;

FIG. 3H shows the second piston then withdraws as the end valve closes, and the cycle restarts;

DETAILED DESCRIPTION OF THE INVENTION

Pyrolytic vessel 300 of the present invention can generally be any vessel, known to the art or to the literature wherein physical and/or chemical reactions can occur and desirably is free of air and oxygen.

Figure 1:
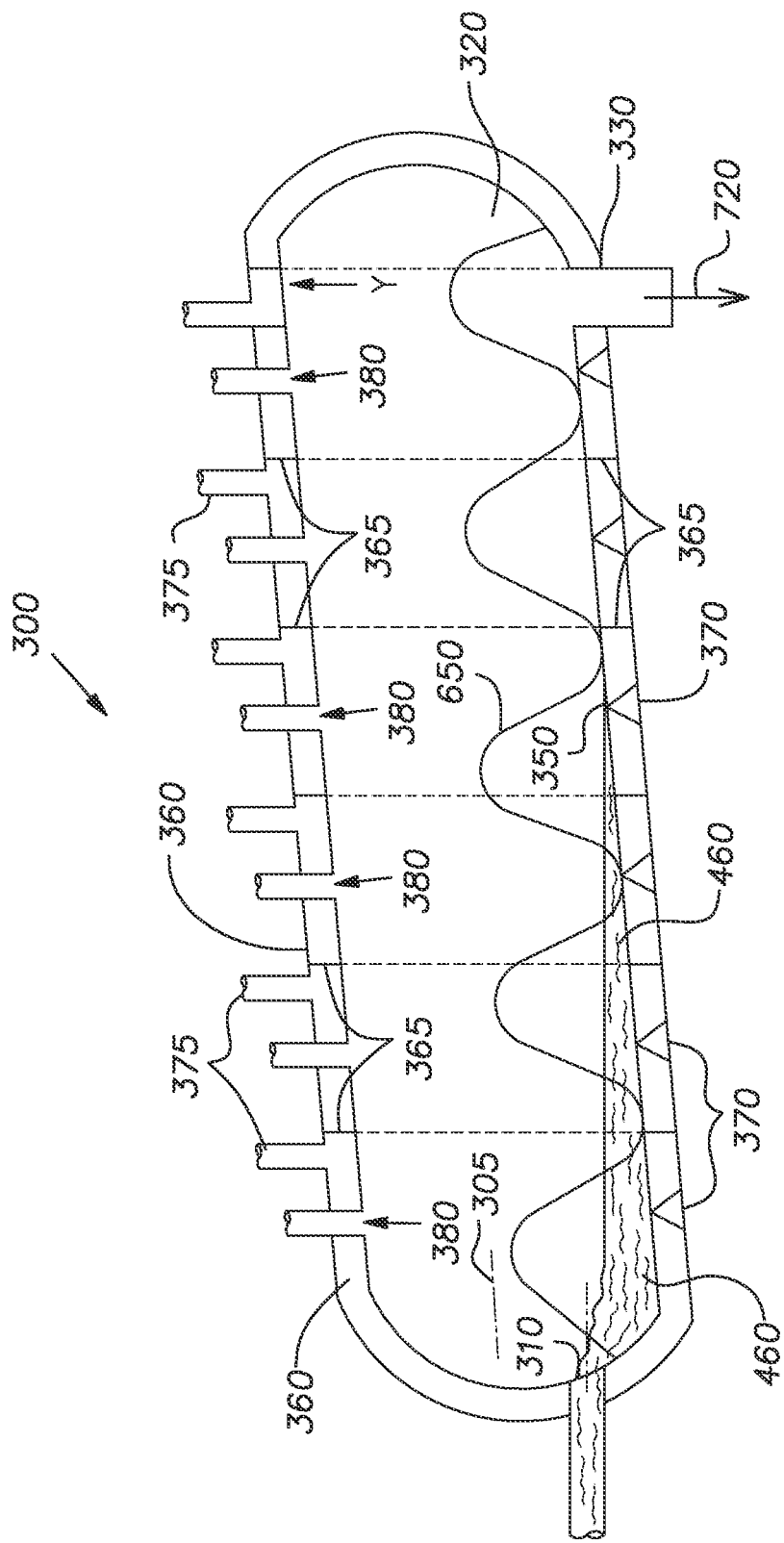
FIG. 1 is a schematic view of a plastic conversion vessel of the present invention wherein various reactions can occur.

That is, the total amount of oxygen based upon the total internal volume of the vessel is less than about 3 volume percent, desirably less than about 2 volume percent, and preferably less than about 1 volume percent, and more preferably nil, that is it is totally free of any air or oxygen. Hence, pyrolytic vessels can be utilized. Vessel 300 does not rotate and does not contain any added catalysts. That is, it is free of any catalyst that is added except for generally small amounts of catalysts that may be inherently contained in one or more polymers and the like. The vessel can generally have multiple heating units 370, multiple reaction stages, multiple product gas exhaust vents 380, and the like, or any combination thereof. Optionally, but preferably, vessel 300 contains an outer shroud 360 having a plurality of inner walls 365 that extend from the shroud to the vessel exterior wall and form heated channels for hot gases to heat the vessel. The heat from heaters 370 thus generally travels around the circumference of the generally cylindrical vessel 300 and exits therefrom through heat exhaust channels 375 at the top of the vessel. The heat in the different sections of vessel 300 generally volatize semi-molten or molten waste material 460 with the gases generated therefrom egressing from the vessel through product exhaust channels 380 where they are fed to a condensation unit, not shown, with the waste being in the form of different types of useable products. Pyrolyzation occurs during transfer of the generally semi-molten and/or molten waste material 460 along the vessel as in FIG. 2 from input or ingress 310, as by rake 650 to vessel upper end 320 via cracking, recombination, reforming, recracking, and the like. Generally, suitable pyrolyzing temperatures in vessel 300 along axis 305, i.e. from left to right of FIG. 1, range from about 900° F. to about 1,200° F. with suitable temperatures in the Y axis, that is from the bottom of the vessel to the top of the vessel, range from about 700° F. to about 1,000° F., and generally from about 800° F. to about 950° F. The temperature of the Z axis, that is from the front side of the vessel to the backside thereof is generally fairly constant therethrough. A preferred vessel that is schematically shown in FIG. 1 is described in U.S. Pat. No. 10,711,202 issued Jul. 14, 2020, and is hereby fully incorporated by reference, with regard to all aspects thereof. The various known reactions such as cracking, reforming, recombination, and recracking, and the like of the waste material of the present invention generally yield various gases such as alkane gases, or various hydrocarbon gases such as naphtha, or various gas oils such as heavy oil, as well as diesel fuel, jet fuel, maritime fuel, various waxes, lubricants, additives, various distillates, light weight organic compounds, and the like.

The yield of gaseous product produced by the present invention is very high and is at least about 70 wt. %, desirably at least about 80 wt. %, and preferably at least about 85 wt. % or 90 wt. % of the feedstock admitted to the vessel. The remaining material is generally classified as a SIR, that is dry, and often contains fillers and other inert material, that is ejected from the upper or egress end 320 of vessel 300 through discharge channel 330.

A desirable aspect of vessel 300 is to generally produce petroleum gas products. Preferable waste material comprises plastics such as polymers in the form of sheets, wrappers, packaging, furniture, plastic housings, containers, and the like, and are utilized that essentially contain only hydrogen and carbon atoms such as polyethylene, high density polyethylene, low density polyethylene, linear low density polyethylene, polypropylene, polystyrene, and the like. Other suitable commercial polymers include polyesters, polycarbonates, polymethyl methacrylates, nylons, polybutylene, acrylonitrile-butadiene-styrene (ABS) copolymers, polyurethanes, polyeters, poly(oxides), poly(sulfides), polyarylates, polyetherketones, polyetherimides, polysulfones, polyvinyl alcohols; and polymers formed by polymerization of dienes, vinyl esters, acrylates, acrylonitrile, methacrylates, methacrylonitrile, diacids, diols, or lactones, or any combination thereof. Still other polymers include block copolymers of the preceding, and alloys thereof. Polymer materials can also include thermoset polymers such as, for example, epoxy resins, phenolic resins, melamine resins, alkyd resins, vinyl ester resins, crosslinked polyester resins, crosslinked polyurethanes; and also crosslinked elastomers, including but not limited to, polyisoprene, polybutadiene, polystyrene-butadiene, polystyrene-isoprene, polyethylene-propylene, ethylene-propylene-diene, and the like, and blends thereof.

In a preferred embodiment, the above different types of waste materials often comprise from about 40% to about 90%, desirably from about 50% to about 85%, and preferably from about 70% to about 80% by weight, of polymers of polyethylenes, polypropylenes and polystyrenes. Any remaining polymers can be, but are not limited to, polyurethane, nylon, PET, and polyvinylchloride, as well as any of the remaining above-noted polymers.

Hydrocarbonaceous material generally includes compounds that have, of course, primarily only carbon and hydrogen atoms such as various bitumens including bitumen tailings as from a mine, various heavy fractions of a fractionating column that include various heavy oils, greases, semi-asphalt compounds, and the like, that by the present invention, are reduced to lighter components, and are mostly various types of hydrocarbon containing gases.

The various above-noted waste materials often include solid inert material (SIR) such as various fillers, pigments, flame retardants, reinforcement materials, silica, aluminum, talc, glass, clay, and the like. The SIR material has a low carbon content, less than about 2% by weight, and thus is not a char and is generally non-hazardous. The SIR amount is about 2% to about 25% by weight, or desirably about 3% to about 20% by weight, or preferably about 3% to about 15% by weight, or most preferably less than about 7% by weight, all based on the total weight of the one or more polymer and/or hydrocarboneous materials. Such compounds generally are not chemically or physically reacted but are emitted from vessel 300 as through vessel discharge channel 330.

Figure 2:
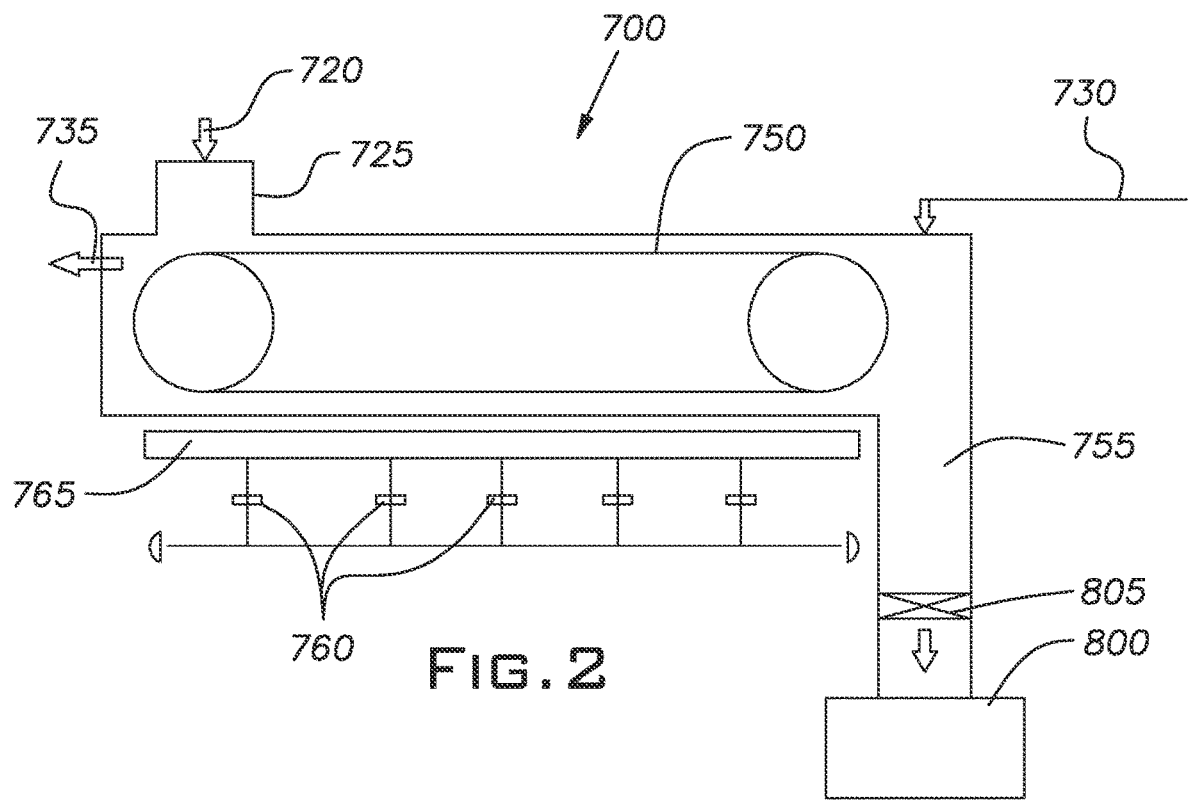
FIG. 2 is a schematic view of a SIR dryer of the present invention.

FIG. 2 relates to SIR dryer and discharge system 700. The SIR is discharged from pyrolytic reactor 300 via discharge channel 330 as shown in FIG. 1. The solid inert discharge material 720 is fed to feed entrance 725 of SIR dryer and discharge system 700 that can generally be rectangular in shape and has one or more heating units 760. Heater 765 is heated by a plurality of burners 760 that heat the bottom of dryer 700 to a temperature sufficiently high to substantially remove any remaining volatile organic material from SIR 720. Examples of such volatile organic materials include aromatic hydrocarbons such as benzene, toluene, xylene, and the like as well as various one or more $C_1$ to $C_{12}$ alkanes, or any combination thereof.

The volatile organic material can be dried such as in or on one or more substrates comprising one or more kettles or containers, on one or more metal trays or sheets, on one or more screens, or on a conveyor belt, and the like, or any combination thereof.

In the embodiment of FIG. 2, the residue, that may contain some residual organic material, is placed on a substate that is conveyor belt 750 where upon heating, any residual volatile organic materials are released from the residue. That is, the residue is dried along the transit course of the conveyor belt. If the drying occurs on any other substance such as the above noted kettles, trays, screens, etc., the same is connected to a movable device such as a chain, belt, conveyor, and the like so that the SIR is transferred to discharge chamber 755. In order to aide in the removal of any volatile organic material obtained from residue 720, an inert, non-condensable sweeping gas 730 such as carbon dioxide, nitrogen, argon, or helium, and the like, or any combination thereof is utilized. Sweep gas 730 is generally admitted a distal end of dryer 700 and can flow countercurrent to the direction of any conveying device and exit through release channel 735 whereupon it can be fed to pyrolysis vessel 300 or recovered by various methods and techniques well known to the literature and to the art. The dried SIR is generally transferred along conveyor 750 or on other drying devices such as a metal tray to generally the other end of dryer containing discharged chamber 755 located distal to SIR feed entrance 725. The dried SIR is then transferred to collection area via valve 805.

The dried SIR material is transferred to collection and/or compaction area and is substantially dried, meaning that the amount of any liquid and/or volatile compounds therein is very low, that is approximately less than 0.5 wt. % or less, desirably about 0.1 wt. % or less and preferably less than about 0.01 wt. % based upon the total weight of the dried SIR product.

Since it is desirable to have a dry SIR product, collection container area 800 can have a cooling system having a heat transfer medium such as nitrogen or argon that is recycled in the container, or cooled outside of the container, or recycled with a blowdown stream as needed, to remove any remaining volatile hydrocarbons. Still further, a fine mist of water or other cooling medium can be sprayed onto the SIR with careful metering such that most of the water is turned to steam and/or vapor and removed from the SIR solids. By contacting the cooling medium directly with the SIR, the cooling surface area is greatly increased, allowing for faster cooling. Alternatively, a drag chain or other mechanism could also be used to spread the SIR powder out for better contact.

In summary, a host of different cooling methods can be utilized to ensure that the purged SIR is dry, and is at a suitable temperature and not excessively hot so that it can be placed in the collection area container for subsequent disposal or beneficial use as a filler, raw material, soil amendment, and the like.

The dried SIR 720 is generally dropped from dyer 700 into a gas-tight collection area 800 that comprises a compression and/or compaction system 810 such as one or more cylinders and pistons and desirably is a multiple compression system containing multiple, e.g., 2, 3, or 4, etc., cylinders and pistons. The different arrangements of the multiple cylinder-pistons compression system are numerous with a preferred embodiment comprising two cylinders and two pistons as set forth in FIGS. 3A through 3H.

Figure 3A:
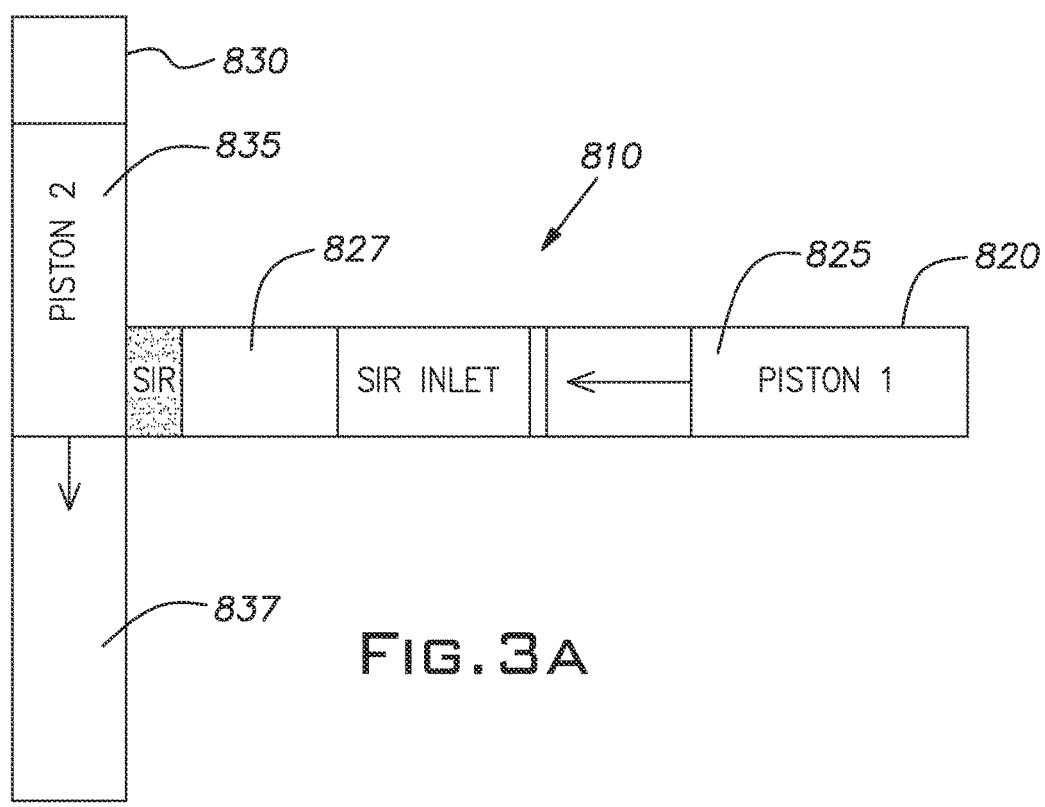
FIGS. 3A-3H are schematic views of sequential stages of a piston and valve system in a collection area wherein the dried and discharged SIR is compacted.
Figure 3B:
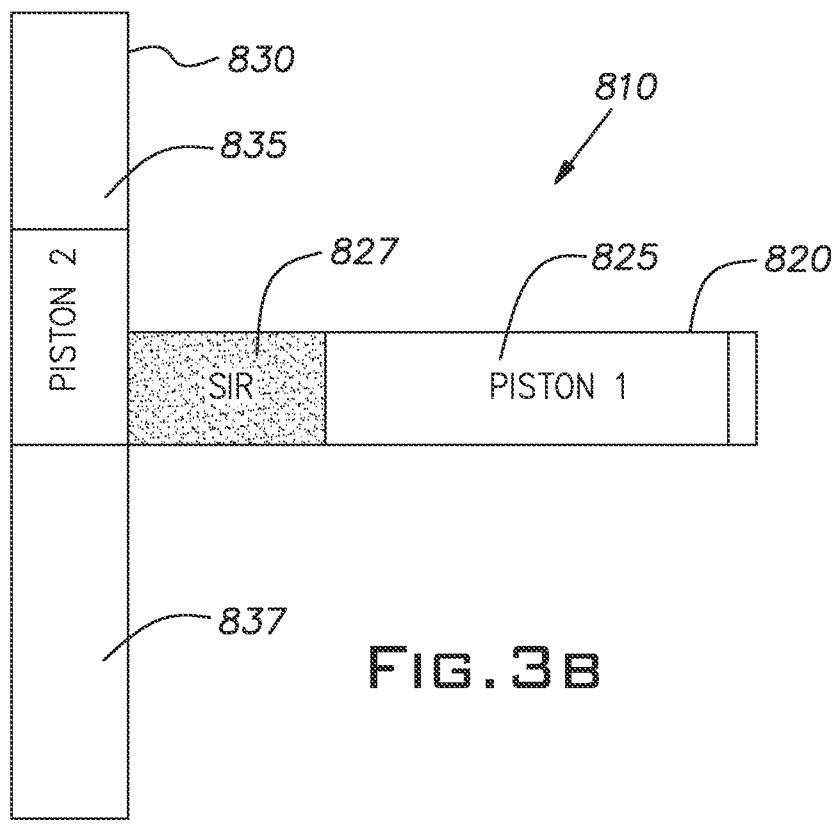
Figure 3C:
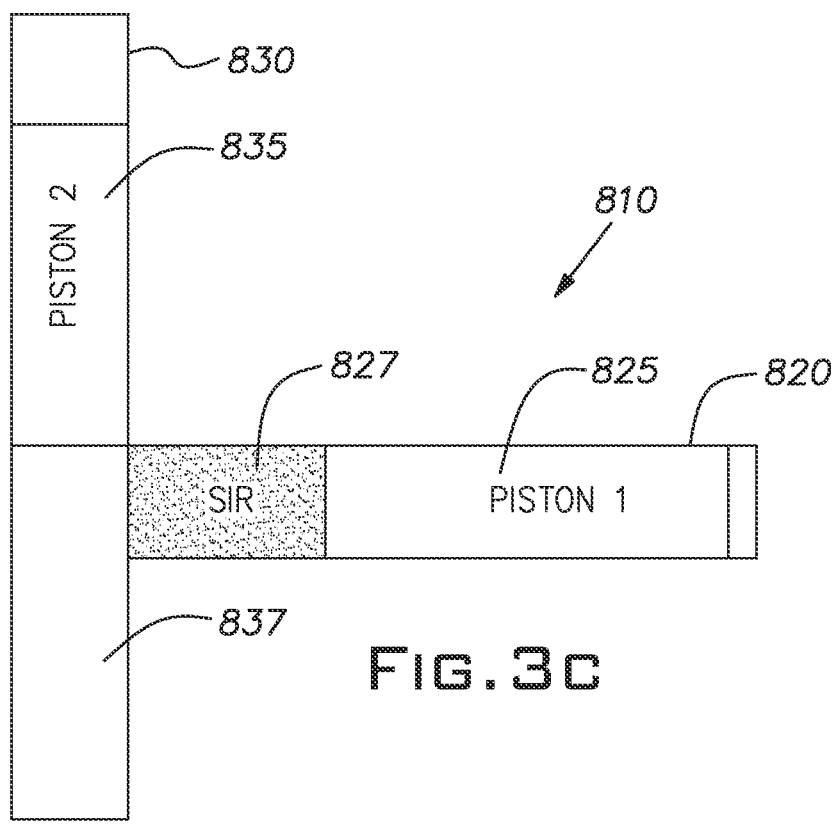
Figure 3D:
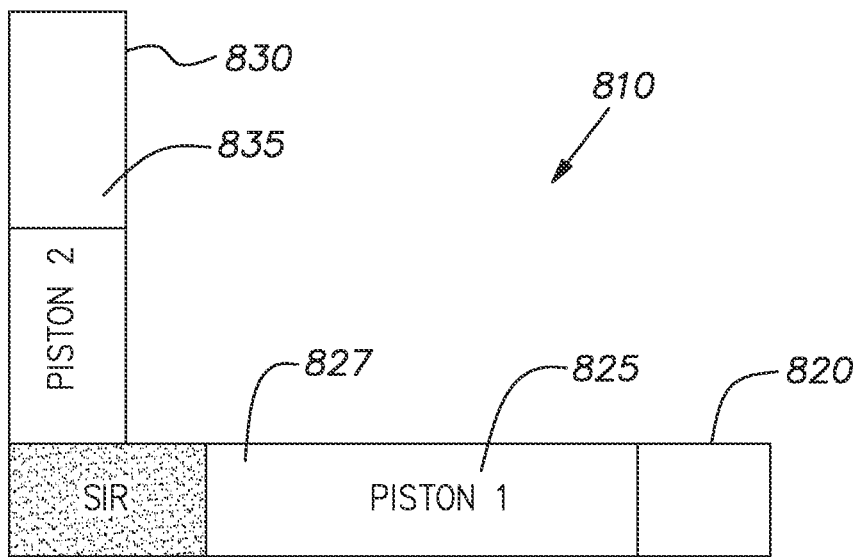
Figure 3E:
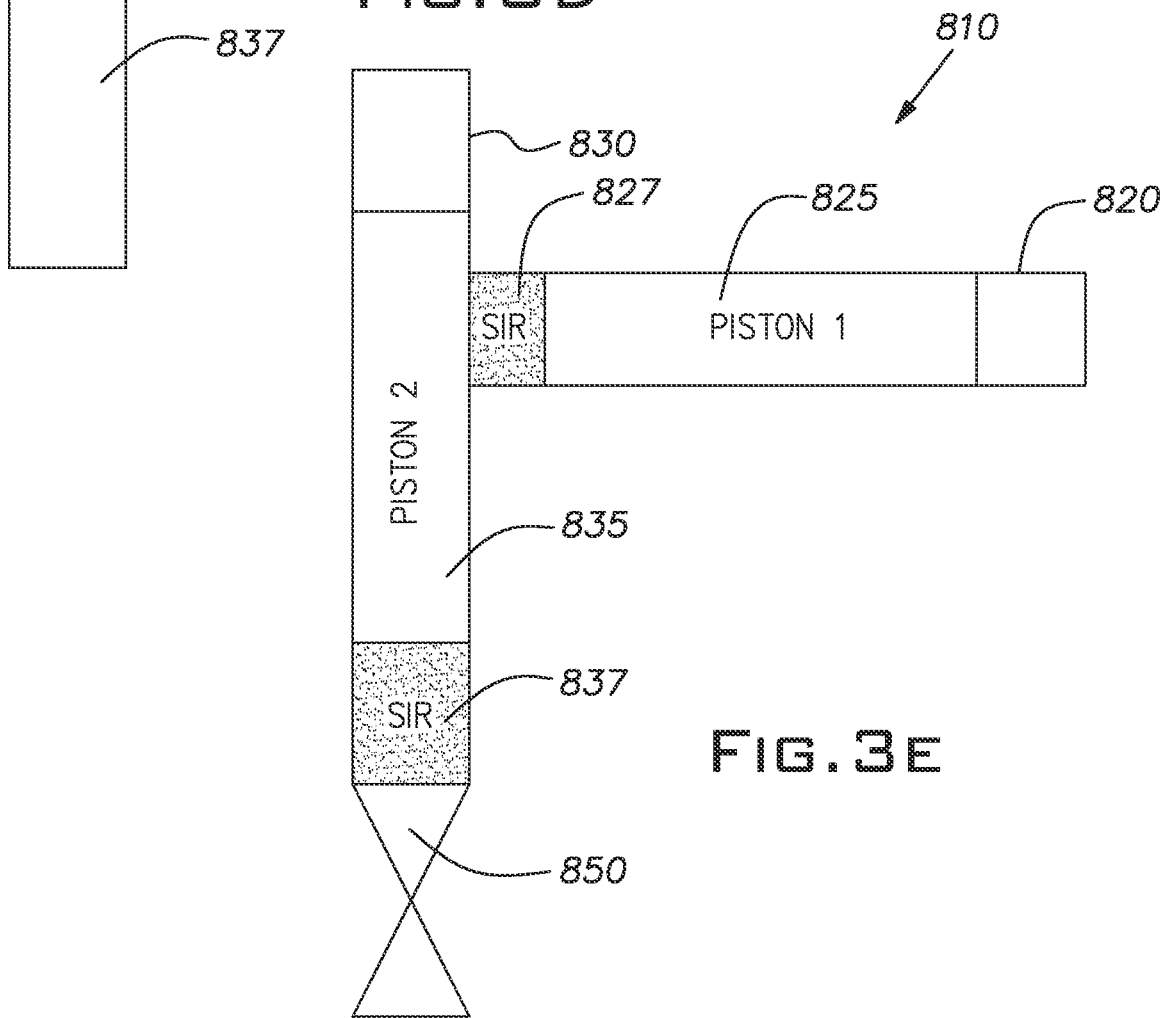
Figure 3F:
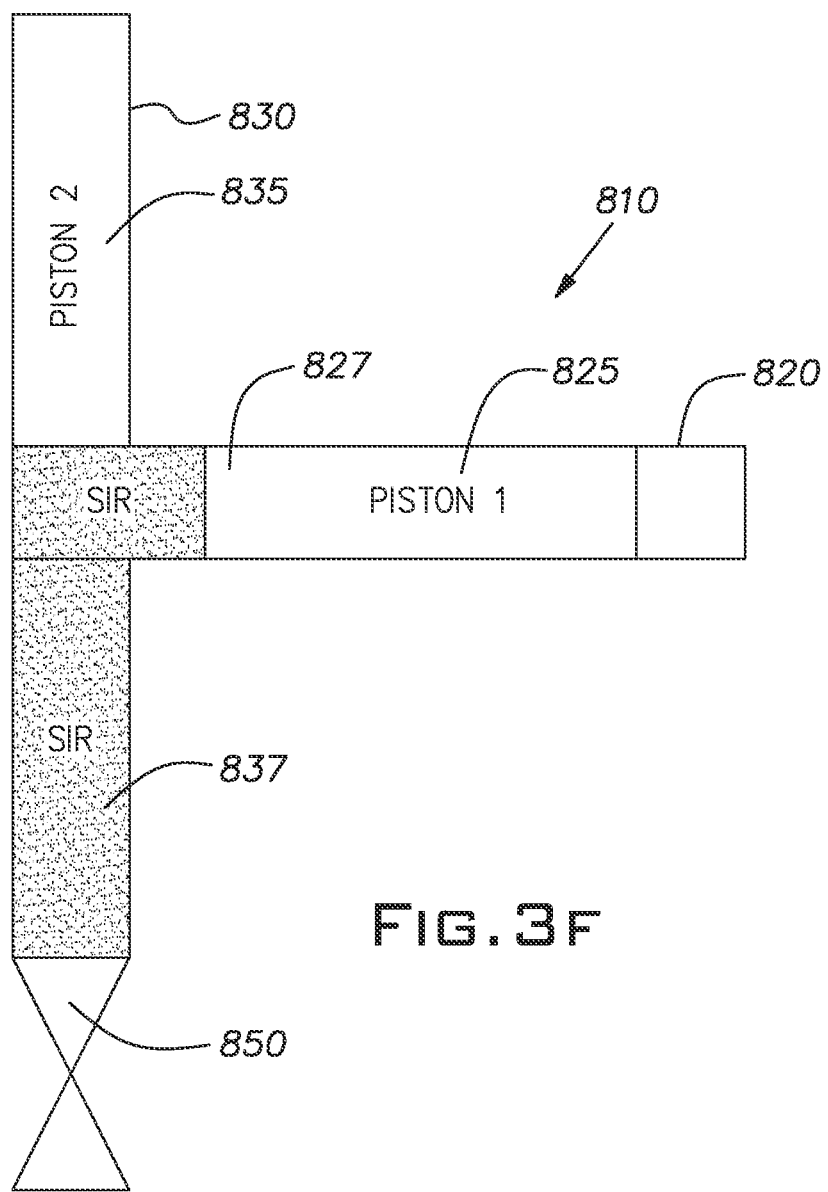
Figure 3G:
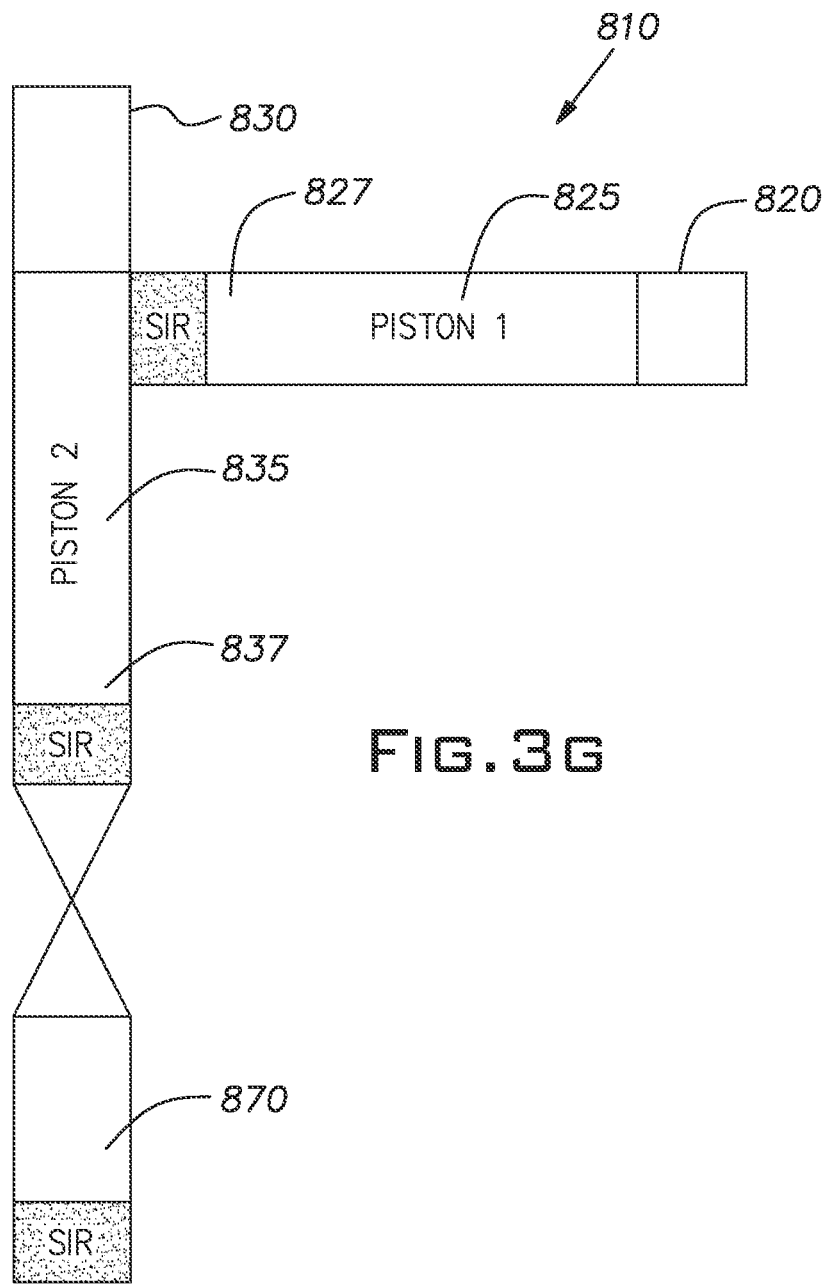
Figure 3H:
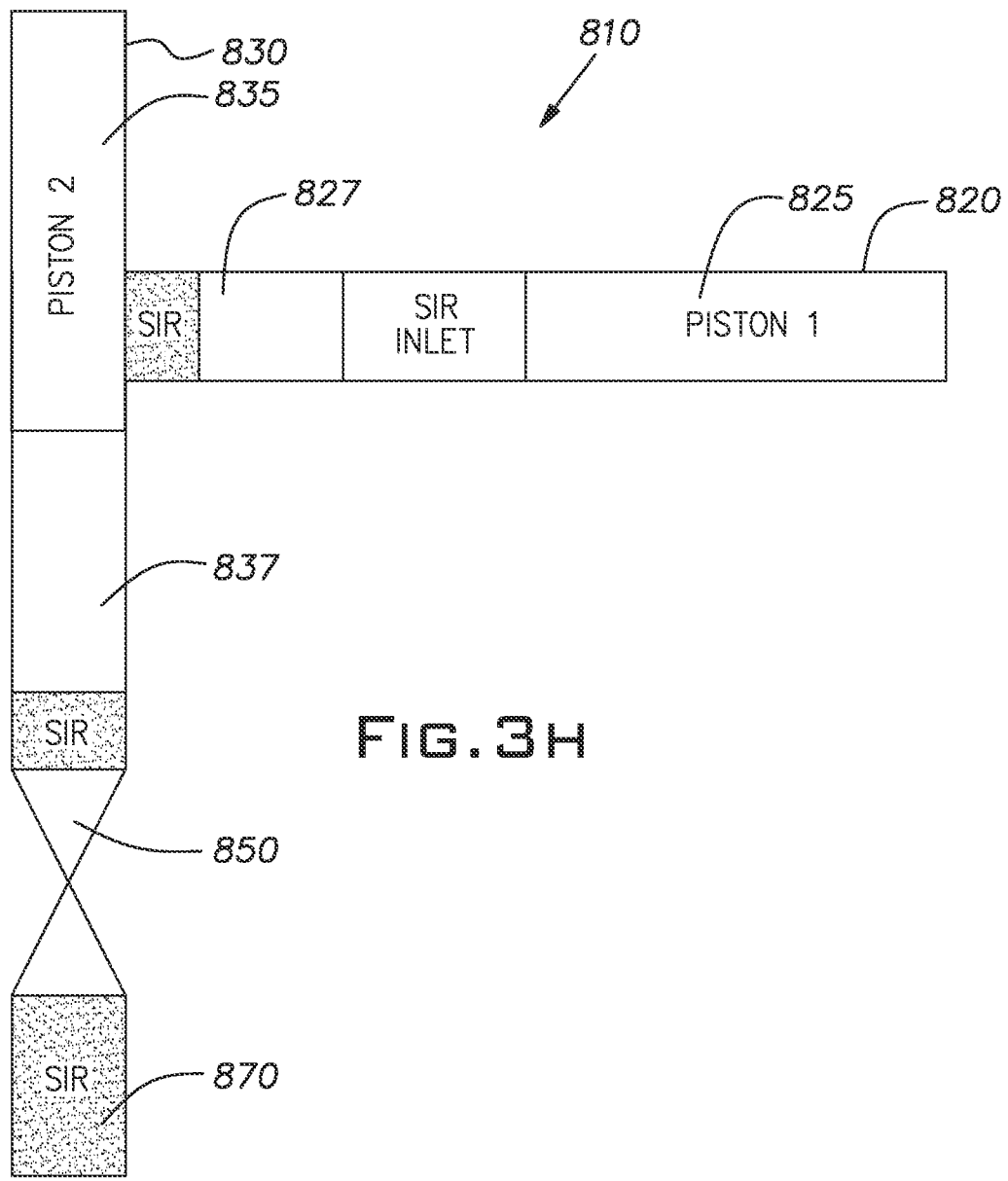

A description of the compression or compaction system 810 of the present invention with respect to packaging and discharging SIR is as follows: in FIG. 3A, the SIR material contained in discharge chamber 755 is added to compaction system 810 that generally comprises a first or a horizontal cylinder 820 and a first piston 825 as well as a second or vertical cylinder 830 and a second piston 835. The SIR material is added directly to first cylinder 820 whereupon being sufficiently full, first piston 825 is actuated to compact the SIR material and push it against side of second cylinder 830 as shown in FIG. 3A. This operation is continued until head space 827 of first or horizontal cylinder 820 generally contains compacted SIR material as shown in FIG. 3B. Subsequently, vertical piston 835 is drawn upward as shown in FIG. 3C with compacted SIR material therein being pushed into vertical cylinder head space 837 and shown in FIG. 3D. Vertical piston 835 is then activated to push the SIR material downward to closed valve 850 located at the bottom of vertical cylinder head space 837, as shown in FIG. 3E. The above operation with regard to compacting SIR in horizontal head space 827 and subsequently compacting the SIR material into the lower head space 837 of vertical cylinder 830 is continued until headspace 837 essentially is filled as shown in FIG. 3F. Thereupon, valve 850 is opened with vertical piston 835 moving the SIR material into a suitable container 870, and the like, as shown in FIG. 3G. This cycle is repeated until container 870 is filled as shown in FIG. 3H.

As piston 835 retracts, there will be a tendency to form vacuum and pull vapor into head space 837. This problem can be solved in many ways. For example, an inert gas can be metered into head space 837 to ensure that no air is pulled into the system. Alternatively, a sealed discharge container with inert gas can also be installed so that any vapors sucked into the system do not contain oxygen.

The entire collection area 800 is locked or airtight meaning that any air, volatile organic materials or gases, and the like, are locked or retained within gas-tight area 800. Thus, upon addition of the residue material into collection area 800, gas-tight valve 805 is closed. Moreover, the compression system, i.e., cylinder and piston system 810 is also gas tight with any air and/or volatile organic material being prevented from escaping therefrom by exit valve 850.

In compaction system 810, the SIR removed will likely still be too hot to safely handle. To cool the SIR material, different approaches can be utilized generally before compaction as noted above. Other solutions include additional cooling time include using longer head space, or cooling can be accomplished by adding augers to stir and cool the material or cooling the external and internal surfaces with cooling water or evaporative cooling.

Alternatively, various conventional cooling systems can be utilized to lower the temperature of any SIR material entering collection area 800 to about 250° F. or less and desirably about 100° F. or lower. For example, if extending the head space and piston lengths to allow enough surface area for them to cool down is impractical, a sealed SIR receiving container 870 as located in collection area 800, see FIGS. 3G and 3H, can be installed to help cool the SIR and/or prevent its exposure to oxygen. This receiving container may be purged with an inert gas such as nitrogen, argon, carbon dioxide, or helium, and may be sealed to receive the SIR and allow the transport elsewhere for the SIR to cool down. It can also incorporate a mechanism to equalize pressure as it cools down, either by an inert gas regulated into the container, or a container and sealing system capable of handling vacuum. The sealing system can be a valve, or a rotating sealed mechanism such as in a revolver, that accepts SIR from the piston/valve setup and deposits it into the sealed container.

Receiving container 870 can also include a mechanism to cool the incoming SIR. For example, it could contain water that quenches the SIR, creating steam, which helps to purge container 870. This could also be done continuously, for example, by venting the steam to atmosphere or a thermal oxidizer if there are volatile organic components, while continuously adding water to maintain a level, and pumping water/SIR slurry out of the container with a solids-robust pump. The water level would be critical to maintain a vapor seal in the container. The container can also include purging with additional inert gas, and an agitator to improve suspension of the SIR in water and improve cooling. The SIR suspended in water can then be filtered back out of the water remotely and sent for further processing or disposal.

Still further, if it is desirable to have a dry SIR product, the container 870 could include cooling with a heat transfer medium such as nitrogen or argon that is recycled in the container, cooled outside of the container, and recycled with a blowdown stream as needed to remove volatile hydrocarbons. By contacting a cooling medium directly with the SIR, the cooling surface area is greatly increased, allowing for faster cooling. A drag chain or other mechanism could also be used to spread the SIR powder out for better contact. Alternatively, water can be sprayed onto SIR with careful metering such that most of the water is turned to steam and removed from the SIR solids.

In summary, a host of different cooling methods can be utilized to ensure that the purged SIR is at a suitable temperature to be placed in the collection bin for subsequent disposal or beneficial use as a filler, raw material, soil amendment, and the like.

Figure 4:
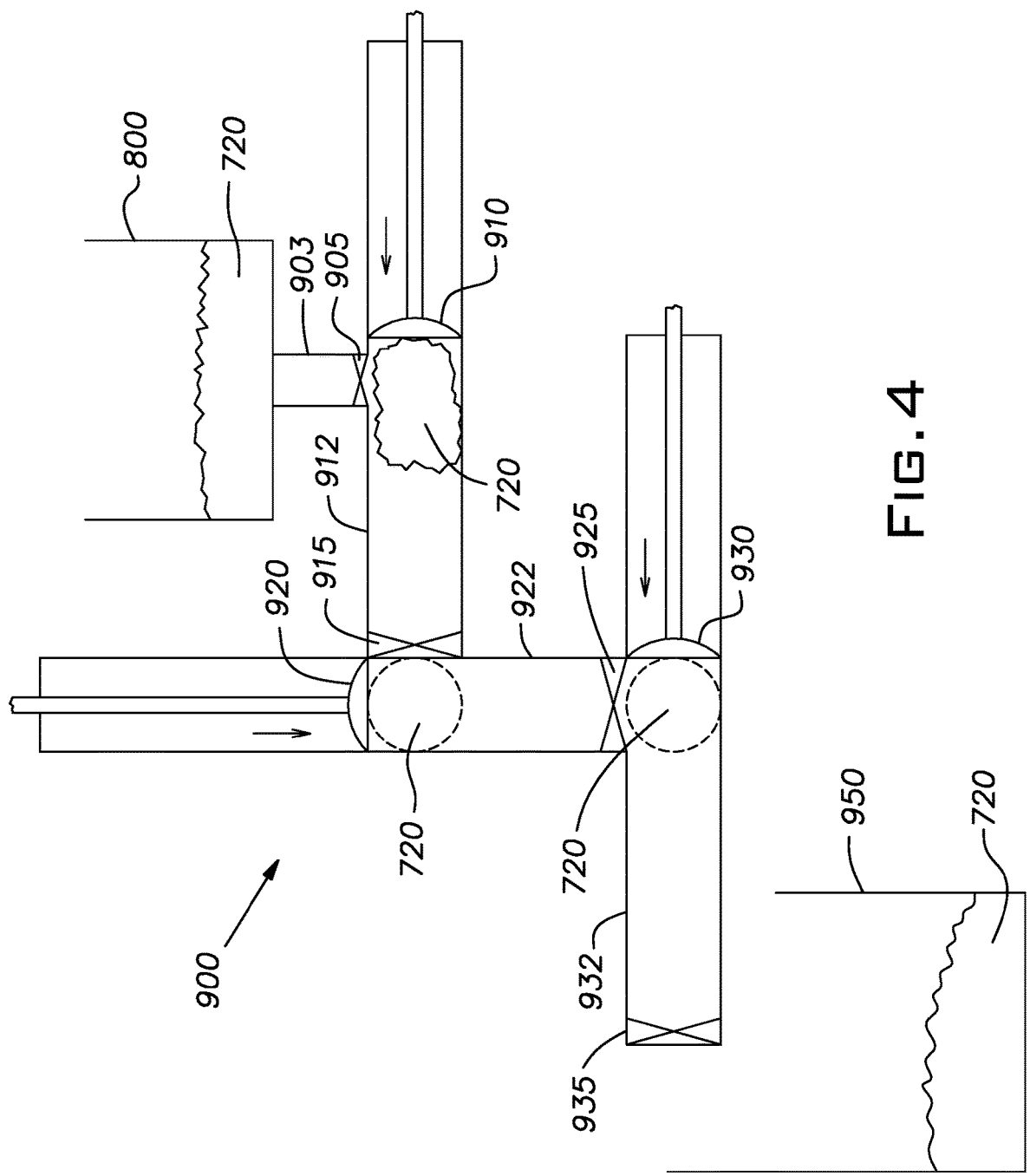
FIG. 4 is a schematic view of the conveyance system of the present invention wherein the SIR material is feed to a plurality of plungers that convey it to a collection container.
Figure 5:
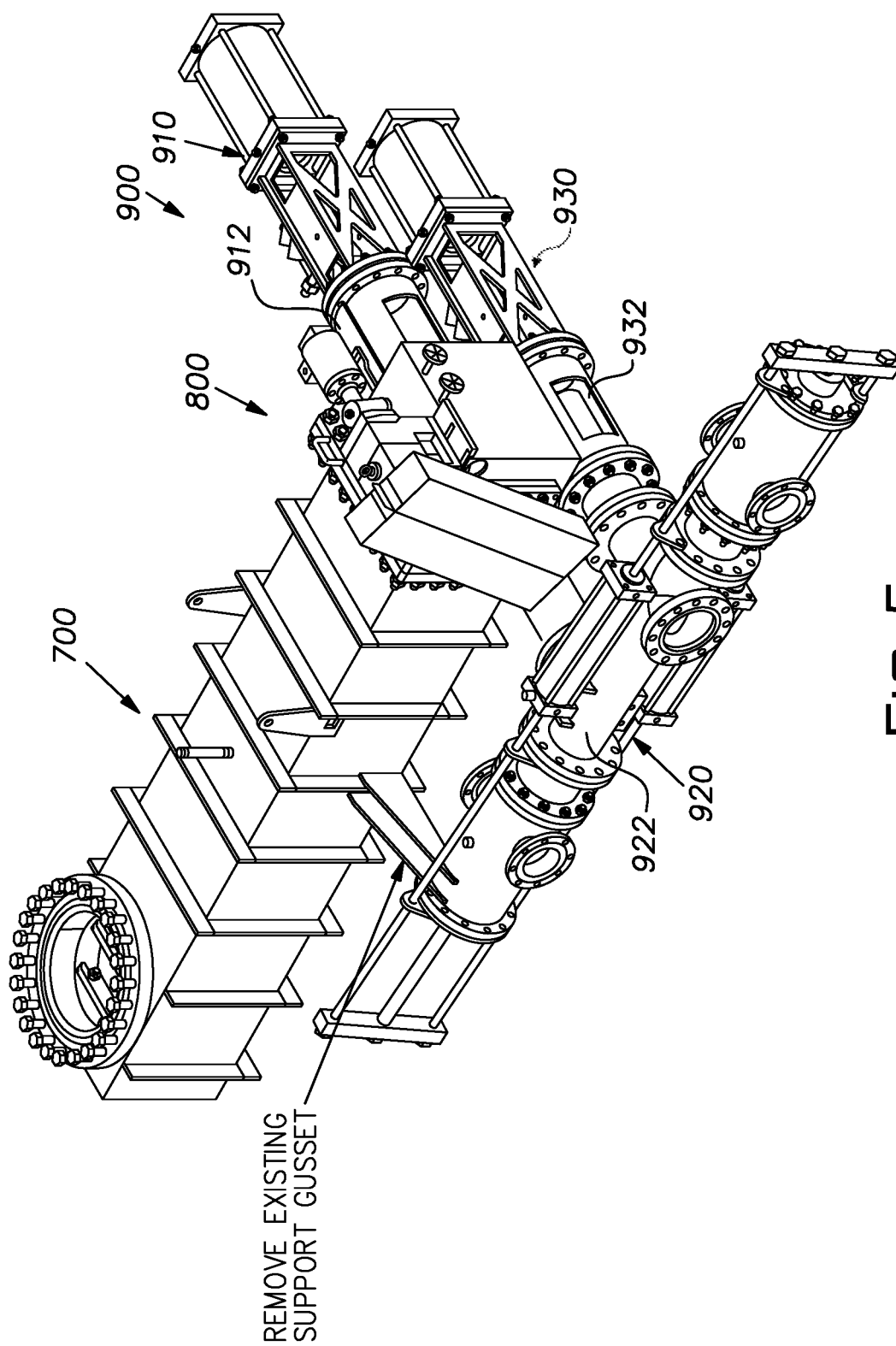
FIG. 5 is a detailed perspective view of the multiple plunger conveyance device of the present invention.

In an alternative embodiment, a modified collection area, that is a more efficient collection and compaction system, is conveyance dispensing apparatus 900 as generally set forth in FIGS. 4 and 5. The SIR material obtained from pyrolytic vessel 300 is dried in dryer 700 as in a manner noted hereinabove, hereby fully incorporated by reference except that no sweep gas is utilized and is collected in collection area 800 as shown in FIG. 4. Transfer tube 903 extends between collection area 800 and conveyance dispensing apparatus 900 that generally contains multiple plungers such as three conveying and compacting plungers, 910, 920, and 930 as shown in FIG. 4. Upon opening of transfer tube valve 905, the SIR material is admitted into first conveying tube 912 that is connected to second conveying tube 922 that in turn is connected to third conveying tube 932. Various sensors, detecting devices, and the like, not shown but are known to the art and to the literature, are utilized to send a signal to the various indicated three plungers when a particular tube area is generally full of SIR material. Thus, after admittance of SIR material to fill first conveying tube 912, transfer valve (egress) 905 is closed, first conveying valve 915 is opened and first plunger 910 is activated and forces the SIR material through valve 915 into second conveying tube 922. Similarly, upon detection that second conveying tube 922 is sufficiently full of SIR material, first conveying valve (egress) 915 is closed, second conveying valve 925 is opened, and second conveying plunger 920 forces the SIR material into third conveying tube 932. Then, conveyance apparatus 900 upon sensing that third conveying tube 932 is sufficiently full of SIR material, second plunger (egress) valve 925 is closed and third plunger valve (egress) 935 is opened and the SIR material is thus transferred via third conveying plunger 930 into collection container 950.

Upon transfer of the SIR material from one plunger area to another, i.e., upon charging the SIR material from the transfer tube to first conveying tube 912 and therefrom to second conveying tube 922, and subsequently to third conveying tube 932, the SIR material, can be compacted to a desired predetermined pressure by each respective plunger. For example, in first conveying tube 912, egress valve 915 can be maintained closed while plunger 910 pushes the SIR material into the valve and compacts the same. Subsequently thereto, valve 915 can be opened and plunger 910, as indicated above, then pushes the SIR material into the next conveying tube, in this case, tube 922. In a similar manner, the SIR material can be compacted in the second and subsequently also compacted in third conveying tube. In summary, the SIR material can be compacted in one or more of the tubes, or all three. While the description of the figures relates to a SIR dryer and extraction system having various plungers, i.e., first conveying plunger 910, second conveying plunger 920, and third conveying plunger 930 and valves therein, the types of plungers can vary, that is they can be a piston, an auger, and the like, or other similar device known to the literature and to the art. Similarly, various conveying tube valves 915, 925, and 935 preferably of the type that can readily form a vapor seal with respect to each of the three conveying transfer tubes. The aforementioned vapor seal is an important aspect of the present system in that it is necessary for safety reasons, for example keeping flammable pyrolysis vapors from escaping from the various conveying tubes.

As shown in FIGS. 4 and 5, plunger 910 is located at the end of collection area 800. As also shown in FIGS. 4 and 5, the SIR material can be added substantially perpendicular or traverse to the travel of first plunger 910 and thus into the side of first conveying tube 912. For example, independently, at an angle of approximately 90° or generally from about 70° to about 110° and desirably at an angle of from about 80° to about 100° with respect to the travel direction of plunger 910. Thereafter, as explained above, the SIR material can be transferred into second conveyor tube 922. Once again, a transfer of the SIR material into the second plunger system or conveying tube 922, independently, is generally at any angle noted immediately above. Optionally but desirably, the second conveyor plunger 920 can also transfer the SIR material to third conveying tube, independently, at any of said above noted angles to third conveying tube 932. The above conveyance dispensing apparatus alignment system 900 has been found to be favorable because the piston mechanisms can be located more compactly in relation to each other, reducing the overall footprint thereof.

In another optional embodiment of the present invention, isolating valves can be utilized that allow the SIR to drop into a box wherein a compaction device such as an auger compresses the SIR to force vapors out thereof as well as to form a partial seal. Subsequently, another isolating valve-box system can be utilized to further remove any vapors. This isolating system thus performs a similar job as pistons, i.e., vapor sealing, conveyance, and compaction, but in a different manner.

As well known to the literature and to the art, the collected SIR material can be disposed of according to various ecological laws, standards, and the like in any given area.

Generally, conveyance dispensing apparatus or assembly 900 can have many shapes, forms, and the like along with numerous valves, sensors, and so forth to permit the flow of the collected, dried SIR material to collection container 950.

While in accordance with the patent statutes, the best mode and preferred embodiment have been set forth, the scope of the invention is not limited thereto, but rather by the scope of the attached claims.

What is claimed is:

1. A solid inert residue (SIR) dryer, comprising:
said dryer having one or more heating units and one or more drying substrates, said dryer capable of heating and drying a SIR on said substrate and removing an amount of volatile organic material therefrom;
said substrate capable of transferring said dried SIR to a collection area;
said collection area comprising a compaction system for compacting said dried SIR;
wherein a first valve is present at an entrance to the collection area which is selectively switchable to form a seal that isolates the collection area from the volatile organic material in the dryer; and
wherein said compaction system comprises at least one cylinder having a piston.

2. The SIR dryer of claim 1, wherein said substrate comprises a container, a metal tray, a metal sheet, a screen, or a conveyor belt, or any combination thereof.

3. The SIR dryer of claim 2, wherein said substrate is said conveyor belt.

4. The SIR dryer of claim 1, wherein said piston is capable of compacting said dried SIR in said at least one cylinder.

5. The SIR dryer of claim 4, wherein said collection area comprises a multiple compaction system including at least a second cylinder having a piston, said second piston capable of further compacting said compressed SIR.

6. The SIR dryer of claim 1, wherein a second valve is present downstream from the first valve and the at least one cylinder having the piston which forms a second seal at an outlet of the collection area.

7. The SIR dryer of claim 6, wherein a third valve is present between the first valve at the second valve which forms a third seal downstream from the at least one cylinder having a piston.

8. The SIR dryer of claim 5, wherein a second valve is present downstream from the first valve and the at least one cylinder having the piston which forms a second seal at an outlet of the collection area.

9. The SIR dryer of claim 8, wherein a third valve is present between the first valve at the second valve which forms a third seal downstream from the at least one cylinder having a piston, and upstream from the second cylinder having the piston.

10. The SIR dryer of claim 5, wherein the first cylinder is a horizontal cylinder and the second cylinder is a vertical cylinder.

11. The SIR dryer of claim 9, wherein the first cylinder is a horizontal cylinder and the second cylinder is a vertical cylinder.

12. A solid inert residue (SIR) dryer, comprising:
said dryer having one or more heating units and one or more drying substrates, said dryer capable of heating and drying a SIR on said substrate and removing an amount of volatile organic material therefrom;
said substrate capable of transferring said dried SIR to a collection area;
said collection area comprising a container having an inert gas therein; and
wherein a first valve is present at an entrance to the collection area which is selectively switchable to form a seal that isolates the container in the collection area from the volatile organic material in the dryer.

13. A process for removing a volatile organic material from the SIR according to claim 1, comprising the steps of:
adding the SIR to the dryer;
heating said dryer and removing said volatile organic material from said SIR;
transferring said dried SIR material to the collection area; and
collecting said dried SIR.

14. The process of claim 13, including compacting said collected dried SIR in said collection area.

15. The process of claim 14, including compressing said collected dried SIR in said at least one cylinder.

16. The process of claim 15, including a second cylinder having a piston, and subsequently compacting said compressed SIR in said second cylinder.

17. The process of claim 16, wherein said dryer further comprises a substrate, said substrate transferring said SIR to the collection area.

18. The process of claim 13, wherein said SIR comprises one or more polymers, or one or more hydrocarbonateous materials, or any combination thereof.

19. The process of claim 18, including transferring said SIR from said collection area to a conveyance dispensing apparatus, said conveying dispensing apparatus comprising a first plunger, a second plunger, and a third plunger, wherein each of said plungers, independently, is located in a conveying tube, and wherein each said tube, independently, comprises a conveying valve.

20. The process of claim 19, wherein each said conveying valve, independently, is capable of forming a vapor seal.

21. The process of claim 19, wherein each said plunger, independently, comprises a piston, or an auger.

22. The process of claim 21, including said plunger compacting said SIR and removing a vapor therefrom.

* * * * *